D. J. McOSKER.
MOTOR VEHICLE.
APPLICATION FILED OCT. 4, 1909.
1,000,743.
Patented Aug. 15, 1911.
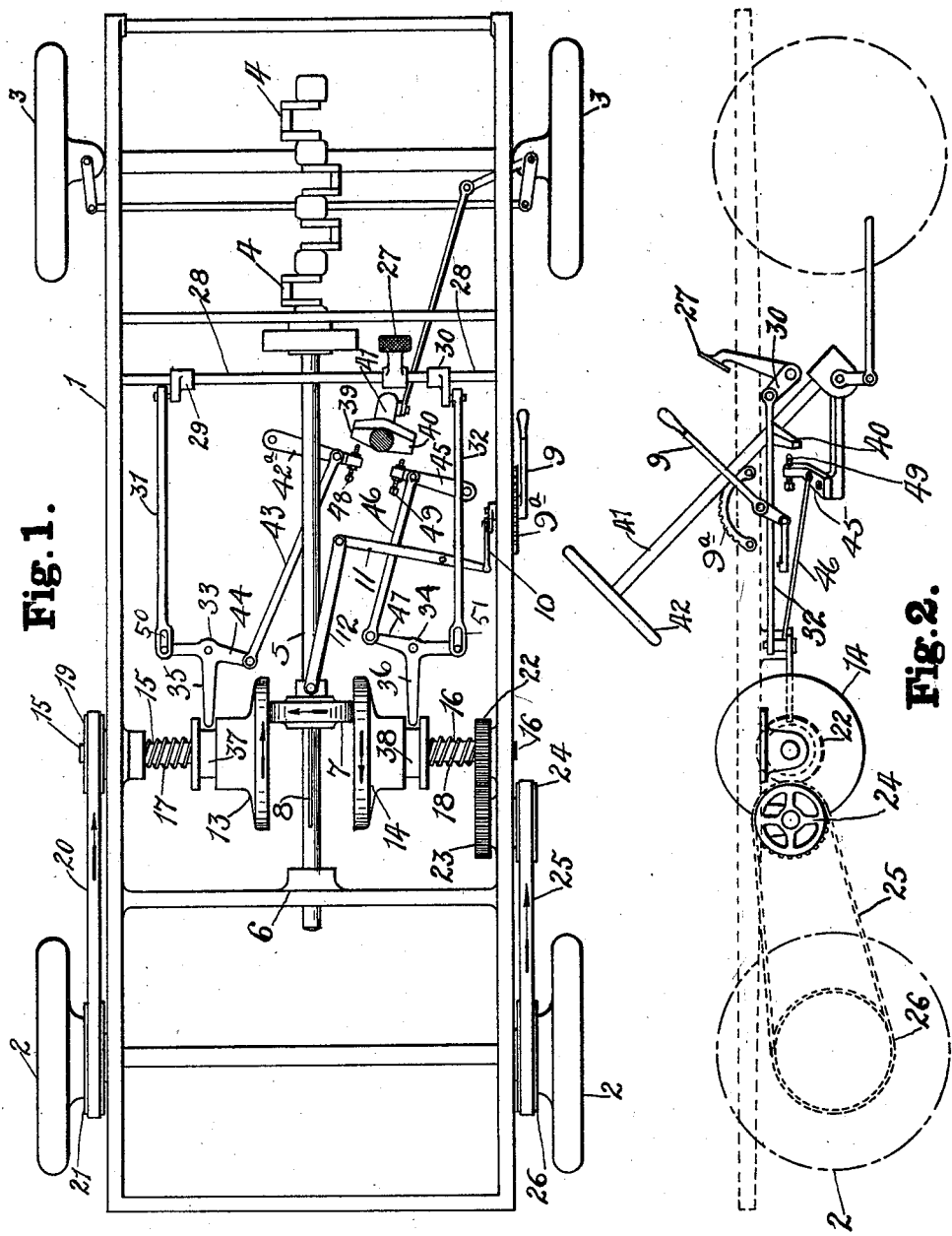
WITNESSES
David P. Craig.
E. D. Ogden
INVENTOR
Daniel J. McOsker.
BY
Howard E. Barlow
ATTORNEY

UNITED STATES PATENT OFFICE.

DANIEL J. McOSKER, OF PROVIDENCE, RHODE ISLAND.

MOTOR-VEHICLE.

1,000,743.

Specification of Letters Patent. Patented Aug. 15, 1911.

Application filed October 4, 1909. Serial No. 520,986.

*To all whom it may concern:*

Be it known that I, DANIEL J. McOSKER, a citizen of the United States, residing at the city of Providence, in the county of Providence and State of Rhode Island, have invented certain new and useful Improvements in Motor-Vehicles, of which the following is a specification, reference being had therein to the accompanying drawing.

This invention relates to a power transmission and controlling mechanism for motor driven vehicles, and has for its object to reduce the expense of constructing the vehicle by simplifying the parts; to eliminate the necessity of using the differential gearing; and to increase the ease of controlling the vehicle by reducing the number of controlling levers to be manipulated by the operator.

An essential feature of my improved construction is the arrangement of cams or fingers connected to the steering wheel post whereby either one or the other of the two friction driven disks is withdrawn from contact with the driving disk by the turning of the steering wheel as the vehicle is being guided either to the right or to the left around a curve.

With these and other objects in view, the invention consists of certain novel features of construction, as will be more fully described and particularly pointed out in the appended claims.

In the accompanying drawings: Figure 1— is a plan view of the chassis of a motor vehicle equipped with my improved power transmitting and controlling mechanism. Fig. 2— is a side elevation of the same.

Referring to the drawings, 1 designates the frame or chassis of the vehicle which is mounted on four wheels, of which 2—2 are the rear traction or driving wheels and 3—3 are the forward or steering wheels. I preferably employ an internal combustion engine, the crank shaft 4 of which is shown in the forward end of the frame, said shaft being coupled to the main shaft 5 by a knuckle joint, not shown, or other suitable means. This main shaft leads back between the side frames and receives support at its rear end in the bearing 6. On this driving shaft is mounted the driving friction wheel 7, the same being adapted to be moved along the shaft over the key 8 by means of the hand lever 9 through the link 10, lever 11 and link 12. This lever may be retained in any desired position by the usual locking latch, not shown, engaging the teeth on the segment 9ª.

At 13 and 14 are two friction faced disks which are slidably mounted on keyways (not shown) in shafts 15 and 16, and which shafts are mounted on suitable bearings, and said shafts are adapted to be driven by contact with the face of driving disk 7 against which they are held by the yielding pressure of springs 17 and 18. Shaft 15 transmits its power to the rear wheel 2 through the pulley 19, belt 20, and rear pulley 21, while shaft 16, in order to reverse its direction of rotation and drive its rear wheel 2 in the proper direction, transmits its power from the gear 22, first through the intermediate gear 23 and then through the pulley 24, belt 25 to the rear pulley 26. Sprockets and sprocket chains are preferably employed instead of the pulleys and belts above described.

In order to disconnect the engine and its driving disk from the driving wheel to stop the vehicle I have provided a simple and effective mechanism comprising a foot lever 27 mounted on a rotatable shaft 28. On this shaft is fixed a pair of crank arms 29 and 30 which are connected through the rods 31 and 32 to knee levers 33 and 34, respectively, each of these levers being provided with a leg 35 and 36, respectively, which extend into corresponding grooves 37 and 38 in the disks 13 and 14 made to receive them, by which arrangement it is only necessary to press the foot lever 27 and both of these disks are simultaneously withdrawn from the driver 7, after which the usual brakes, not shown, may be applied and the car stopped while the engine continues to run.

One of the essential features of my invention is my simplified and improved mechanism whereby the differential gearing, usually employed in motor vehicles, is eliminated. In accomplishing this I have mounted a pair of fingers 39 and 40 upon opposite sides of the wheel post 41 whereby when the steering wheel 42 is turned to the left the finger 39 engages the lever 42ª and through the connection 43, lever arms 44 and 35 of the knee lever 33 withdraws the friction disk 13 from engagement with the driving disk 7, thus disconnecting the left hand wheel and driving only through the right. When the steering wheel 42 is turned to the right the finger 40 engages the end of the lever 45 and through the connecting rod 46 and the arms 47 and 36 of the knee lever 34 the disk 14 is withdrawn from engagement with the driver 7, at which time the vehicle is driven only through the left hand wheel thus entirely obviating the necessity of using the differential gearing usually employed.

The free ends of levers 42ª and 45 are provided with set screws 48 and 49, respectively, so that the distance between these ends and the engaging surfaces of the fingers 39 and 40 of the wheel post may be readily adjusted so as to regulate the amount the steering wheel shall turn either one way or the other before it will disconnect one of the driving wheels.

The connecting rods 31 and 32 are slotted at 50 and 51, respectively, so that the knee levers 33 and 34 may be operated from the steering post to withdraw the individual disks 13 and 14 without interfering with the operation of the foot lever 27.

The operation of my improved transmission and controlling mechanism may be further described as follows: In bringing the vehicle to rest the handle of the lever 9 is moved backward sliding the driving disk 7 to its central or inoperative position, in which position the engine may continue to run without affecting the driving mechanism. When it is desired to start ahead the lever 9 may be carried forward a notch at a time until the desired speed leverage is obtained, after which the speed may be controlled in the usual way by regulating the supply of gas to the engine. The reverse is obtained by a continued rearward movement of the lever 9 carrying the driver disk back of the center of the two friction disks 13 and 14.

The foot lever 27 may be used in the case of emergency when it is desired to quickly release the engine from the driving mechanism and apply the brakes, which latter may be operated in the usual way by another foot lever or other suitable means not shown.

By controlling the engagement of the individual disks 13 and 14 with the driver 7 by means of simply rotating the steering wheel 4, an extremely simple mechanism is provided for automatically taking care of the differential movement of the driving wheels which occurs when the vehicle turns out of a straight course.

I do not wish to be restricted to the precise construction and arrangement of parts herein shown and described, nor to the various details thereof, as the same may be modified or re-arranged in various particulars without departing from the spirit and scope of my invention, one practical embodiment of which has been herein illustrated and described without attempting to show all of the various forms and modifications in which the invention might be embodied.

Having thus described my invention, what I claim as new and desire to secure by Letters Patent, is:

1. In a motor vehicle the combination of a driven shaft, a friction driving member slidably mounted on said shaft, power transmitting friction members movable toward and from opposite sides of said driving member to be driven thereby when in contact therewith, means connecting each driven member with its corresponding rear traction wheel, a hand-operating steering post, said post having fingers extending in substantially opposite directions, levers having their swinging ends adjacent but normally out of contact with said fingers, and connections between said levers and the power transmitting friction members whereby the said steering post may be operated to some extent without affecting either of the said friction members, further movement of the steering post being adapted to cause one of said fingers to actuate one of said levers and its connected friction member.

2. In a motor vehicle the combination of a driven shaft, a friction driving member slidably mounted on said shaft, power transmitting friction members movable toward and from opposite sides of said driving member to be driven thereby when in contact therewith, means connecting each driven member with its corresponding rear traction wheel, a hand-operating steering post, said post having fingers extending in substantially opposite directions, levers having their swinging ends adjacent but normally out of contact with said fingers, levers operatively connected with said friction members to control their relationship with the driving member, links connecting the first-mentioned levers and the last mentioned levers, and independent means for simultaneously actuating both of the levers which control the positions of the power transmitting members so that both of the latter may be removed from operative connections with said driving member.

3. In a motor vehicle the combination of a driven shaft, a friction driving member slidably mounted on said shaft, power transmitting friction members movable toward and from opposite sides of said driving member to be driven thereby when in contact therewith, means connecting each driven member with its corresponding rear traction wheel, a hand-operating steering post, said post having fingers extending in substantially opposite directions, levers having their swinging ends adjacent but normally out of contact with said fingers, links connected to said levers, a shaft having a foot lever and also provided with two crank arms, levers for shifting the positions of the power transmitting members relatively to the driving member, said shifting levers being connected to said links to be actuated thereby, and links connecting said shifting levers and crank arms whereby both of the power transmitting members may be simultaneously moved toward or away from the driving member.

4. In a motor vehicle the combination of a driven shaft, a friction driving disk slidably mounted on said shaft, power transmitting friction disks arranged to yieldingly engage opposite sides of said driving disk, means connecting each driven disk with its corresponding rear vehicle wheel, a hand-operated steering post, engaging members on said post, a pair of three-armed levers each having one arm operatively engaged with one of said driven disks, connections with a second arm of each of said levers adapted to be engaged by said engaging members to cause either one or the other of said levers to withdraw its individual disk from engagement with said driving disk when the steering wheel post is turned in guiding the vehicle, and means connected with the third arm of each of said levers for actuating both levers simultaneously.

5. In a motor vehicle the combination of a driven shaft, a friction driving disk slidably mounted on said shaft, power transmitting friction disks arranged to yieldingly engage opposite sides of said driving disk, means connecting each driven disk with its corresponding rear vehicle wheel, a hand-operated steering post, engaging members on said post, a three-armed lever operatively engaged with each driven disk, connections with one arm of each of said levers adapted to be engaged by said engaging members to cause either one or the other of said levers to withdraw its individual disk from engagement with said driving disk when the steering wheel post is turned in guiding the vehicle, means connected with other arms of said levers for actuating both levers simultaneously, and adjustable means for controlling the withdrawing action of said driven disks.

In testimony whereof I affix my signature in presence of two witnesses.

DANIEL J. McOSKER.

Witnesses:
HOWARD E. BARLOW,
E. I. OGDEN.

---

Copies of this patent may be obtained for five cents each, by addressing the "Commissioner of Patents, Washington, D. C."